United States Patent
Kagohashi et al.

(10) Patent No.: US 6,863,708 B2
(45) Date of Patent: Mar. 8, 2005

(54) METHOD FOR PRODUCING METAL POWDER AND METAL POWDER, AND ELECTROCONDUCTIVE PASTE AND MONOLITHIC CERAMIC CAPACITOR

(75) Inventors: Wataru Kagohashi, Chigasaki (JP); Mitsugu Yoshida, Chigasaki (JP); Tsuyoshi Asai, Chigasaki (JP)

(73) Assignee: Toho Titanium Co., Ltd., Kanagawa (JP)

(*) Notice: Subject to any disclaimer, the term of this patent is extended or adjusted under 35 U.S.C. 154(b) by 13 days.

(21) Appl. No.: 10/343,936

(22) PCT Filed: Jun. 11, 2002

(86) PCT No.: PCT/JP02/05810

§ 371 (c)(1),
(2), (4) Date: Feb. 5, 2003

(87) PCT Pub. No.: WO02/102533

PCT Pub. Date: Dec. 27, 2002

(65) Prior Publication Data

US 2003/0159281 A1 Aug. 28, 2003

(30) Foreign Application Priority Data

Jun. 14, 2001 (JP) .................................... 2001-179571

(51) Int. Cl.$^7$ .................................................. B22F 9/26
(52) U.S. Cl. ............................. 75/364; 75/369; 75/374
(58) Field of Search ........................... 75/255, 364, 369, 75/374

(56) References Cited

U.S. PATENT DOCUMENTS

| | | | |
|---|---|---|---|
| 5,853,451 A | 12/1998 | Ishikawa | |
| 6,168,752 B1 * | 1/2001 | Kagohashi et al. | 266/171 |
| 6,235,077 B1 * | 5/2001 | Kagohashi et al. | 75/369 |
| 6,312,496 B1 * | 11/2001 | Katayama et al. | 75/255 |
| 6,406,513 B2 * | 6/2002 | Yamaguchi et al. | 75/255 |
| 6,494,931 B1 * | 12/2002 | Mukuno et al. | 75/255 |
| 6,632,265 B1 * | 10/2003 | Mukuno et al. | 75/739 |
| 6,632,524 B1 * | 10/2003 | Toshima et al. | 428/357 |
| 2002/0108469 A1 * | 8/2002 | Behrens | 75/770 |

FOREIGN PATENT DOCUMENTS

| | | | |
|---|---|---|---|
| JP | 5-247508 | 9/1993 | ............ B22F/9/28 |
| JP | 6-72247 | 9/1994 | ............ B22F/9/28 |
| JP | 6-346119 | 12/1994 | ............ B22F/9/28 |
| JP | 11-140514 | 5/1999 | ............ B22F/9/28 |
| JP | 11189801 | 7/1999 | |
| JP | 11-189813 | 7/1999 | ............ B22F/9/28 |
| JP | 11/201956 | * 7/1999 | |
| JP | 2002-180111 | 6/2002 | ............ B22F/9/04 |
| WO | WO-99/64191 A1 * | 12/1999 | |
| WO | WO-00/06326 A1 * | 2/2000 | |
| WO | WO-00/74881 A1 * | 12/2000 | |
| WO | WO-01/15838 A1 * | 3/2001 | |
| WO | WO-01/34327 A1 * | 5/2001 | |
| WO | WO-01/36131 A1 * | 5/2001 | |

OTHER PUBLICATIONS

International Search Report.

* cited by examiner

*Primary Examiner*—George Wyszomierski
(74) *Attorney, Agent, or Firm*—Antonelli, Terry, Stout & Kraus, LLP

(57) ABSTRACT

Metal chloride vapor and reducing gas are brought into contact to form metallic powder, the metallic powder is washed in carbonic acid aqueous solution, and the metallic powder is classified in a liquid phase. In this way, metallic powder, such as nickel powder, in which the content of chloride components is extremely small and the coarse particle content is small, can be efficiently produced.

7 Claims, 1 Drawing Sheet

METHOD FOR PRODUCING METAL POWDER AND METAL POWDER, AND ELECTROCONDUCTIVE PASTE AND MONOLITHIC CERAMIC CAPACITOR

TECHNICAL FIELD

The present invention relates to a process for production of metallic powders such as nickel powder which is suitable as a raw material of conductive paste fillers used in electronic parts such as multilayer ceramic capacitors, and relates to the metallic powder, and relates to conductive paste containing the metallic powder and to multilayer ceramic capacitors.

BACKGROUND ART

Metallic powder having average particle diameters of 1 μm or less (which may be called "ultrafine" particles) such as Ni, Ag, Cu, or Fe are very useful as a conductive paste for electrical materials, in particular, for internal electrodes forming material or magnetic material used in multilayer ceramic capacitors.

Heretofore, noble metallic powders such as Ag, Pd, Pt and Au or base metallic powders such as Ni, Co, Fe, Mo and W are used in conductive pastes for electrical materials, in particular, as conductive pastes forming internal electrodes for multilayer ceramic capacitors. Generally, a multilayer ceramic capacitor is made by alternately laminating ceramic dielectric layers and metallic layers which are used as internal electrodes, and by forming external electrodes which are connected to the metallic layer of internal electrodes on both outsides of the ceramic dielectric layers. Material having a high dielectric constant material as a main component such as barium titanate, strontium titanate and yttrium oxide are used in the dielectric substances. On the other hand, noble metallic powders or base metallic powders mentioned above are used as metal which forms the internal electrodes. However, since more inexpensive electrical materials are required recently, the latter base metallic powders are considered to be more useful. In particular, a multilayer ceramic capacitor in which electrodes are made by forming ceramic dielectric layers of ultrafine nickel layers having particle diameters of 0.1 to 1.0 μm have been greatly developed.

Ultrafine metallic powders described above can be produced by various methods. Recently, vapor phase reduction, in which metal chloride vapor and reducing gas such as hydrogen are contacted, is widely adopted. By this method, ultrafine metallic powder having diameters of 1 μm or less can be obtained inexpensively, and the diameter of particles can be freely controlled.

However, metal chloride and hydrochloric acid may remain on the surface of the ultrafine metallic powder when metal chloride is used as a raw material. These chloride components are difficult to remove by washing with water. Recently, the size of multilayer ceramic capacitors has been reduced and the capacitance of the multilayer ceramic capacitors has increased, and not only metallic powders having average diameters of 0.4 μm but also metallic powders having average diameters of 0.1 to 0.2 μm are required. However, the smaller the particle diameters become, the greater the chloride components contained in metallic powder produced in a reducing furnace become, and the chloride components are difficult to remove.

These chloride components which are contained in metallic powder reduce the purity of the ultrafine metallic powder as product, promote oxidation of the metal, and cause the deterioration (rust) of the metal. Furthermore, the chloride components cause deterioration over time of the conducting paste, and they may influence the characteristics of the electrode formed by the paste. Therefore, ultrafine metallic powder which has less chloride components and higher purity is required as a material for electrodes used in, for example, multilayered ceramic capacitors.

To remove chloride components contained in metallic power, washing process with water can be considered. However, the sedimentation rate of metallic powder in water becomes slower as chloride components are reduced by this water-washing, it becomes difficult to separate and collect the metallic powder by decantation, and as a result, washing efficiency is reduced. Furthermore, yield of the product may be reduced by removing supernatant which contains metallic powder by decantation. Therefore, development of a technique to remove chloride components has become important.

To remove chloride components contained in metallic powder such as nickel powder, a technique in which metallic powder is washed with water which contains organic acid is disclosed in Japanese Unexamined Patent Application Publication No. 189813/99, and a technique in which metallic powder is washed with water which contains chelating agent is disclosed in Japanese Unexamined Patent Application Publication No. 346119/94. Although these techniques can remove the chloride component sufficiently, metallic powders aggregate together to form coarse particles, or precipitates may adhere. In a forming process for a membrane electrode having a thickness of about 1 to 2 μm, a non-uniform paste coating may be formed and a multilayered electrode membrane cannot be formed any longer if these coarse particles and aggregated coarse particles exist. Therefore, a removing process for the coarse particles is required using a method such as classification by a liquid cyclone. However, such coarse particles in which metallic powders are aggregated are difficult to remove. From this viewpoint, the technique described above is insufficient.

There is also another problem in that hydroxides of metals are generated on the surface of the metallic powder by washing the metallic powder in water. Non-uniform oxide layer is formed on the surface of the metallic powder if the metallic powder having hydroxide on its surface is dried. As a result, dispersibility is deteriorated and the metallic powder agglomerates together in the case in which conductive paste is formed. Furthermore, in the case in which the conductive paste is used as internal electrodes in a multi-layer ceramic capacitor, cracking or delamination may occur because the sintering characteristics of the metallic powder are unstable.

Therefore, objects of the present invention are to provide a process for production of metallic powder in which chloride components and hydroxide are efficiently removed, chloride components are extremely small, and minimal coarse particles are included as an after-treatment of the metallic powder made by vapor phase reduction which is applied to metal chloride as a raw material, and also to provide the metallic powder produced by this method, and conductive paste and multilayer ceramic capacitors formed by the metallic powder.

Objects of the present invention are described more concretely as follows.

(1) To provide a method in which chloride components contained in metallic powder can be washed and removed.

(2) To provide a washing method in which the metallic powder can precipitate immediately even after chloride components are removed.
(3) To provide a washing method in which chloride components can be removed without organic compounds remaining on the surface of the metallic powder.
(4) To provide a method in which aggregation of the metallic particles does not occur in the washing process and therefore classification can be applied efficiently.
(5) To provide metallic powder having sufficient dispersibility and sintering characteristics by removing hydroxide and forming uniform oxide layer on the surface of the metallic powder.

Although the metallic powder produced in the present invention is very suitable as a raw material of internal electrodes in a multilayer ceramic capacitor, it is not limited to this, and this metallic powder is also suitable for other uses such as for sintered materials, magnetic materials, or catalysts.

DISCLOSURE OF INVENTION

The inventors performed further research to achieve the objects described above, and it became clear that chloride components and hydroxide on the surface of the metallic powder can be efficiently removed by washing the metallic powder obtained by vapor phase reduction in carbonic acid aqueous solution. Furthermore, it also became clear that coarse particles can be removed extremely efficiently by applying classification process in liquid phase after this washing process, and as a result, the metallic powder in which minimal chloride components and coarse particles are contained can be produced efficiently, and thus the present invention was completed.

That is to say, the characteristics of the process for production of the metallic powder of the present invention is to wash metallic powder which is obtained by contacting metal chloride vapor and reducing gas, in carbonic acid aqueous solution.

In the process for production of the metallic powder of the present invention, it is desirable that chloride components and/or hydroxide remaining on the surface of the metallic powder which is obtained by contacting metal chloride vapor and reducing gas be removed by washing in carbonic acid aqueous solution. Furthermore, it is desirable that the washing process in carbonic acid aqueous solution be conducted within a range of pH of 4.0 to 6.5.

In the process for production of the metallic powder of the present invention, it is also desirable that metal chloride vapor and reducing gas be contacted to form the metallic powder, the metallic powder be put in pure water to form a water slurry, carbonic acid gas be dissolved in the water slurry to prepare a carbonic acid aqueous solution, and the washing process be conducted. Furthermore, in the process for production of the metallic powder of the present invention, it is also desirable that the metallic powder obtained by the method described above be classified in liquid phase.

Furthermore, in the process for production of the metallic powder, it is desirable that the metallic powder be washed by the method described above, dissolved carbonic acid be removed from the aqueous solution, and the metallic powder be separated and collected.

The metallic powder produced by the process for production of the present invention is desirably nickel powder. Furthermore the present invention also provides metallic powder obtained by the process for production described above, conductive paste which is contains the metallic powder, and multilayer ceramic capacitors including internal electrodes which are formed of the metallic powder.

BEST MODE FOR CARRYING OUT THE INVENTION

Figure 1:
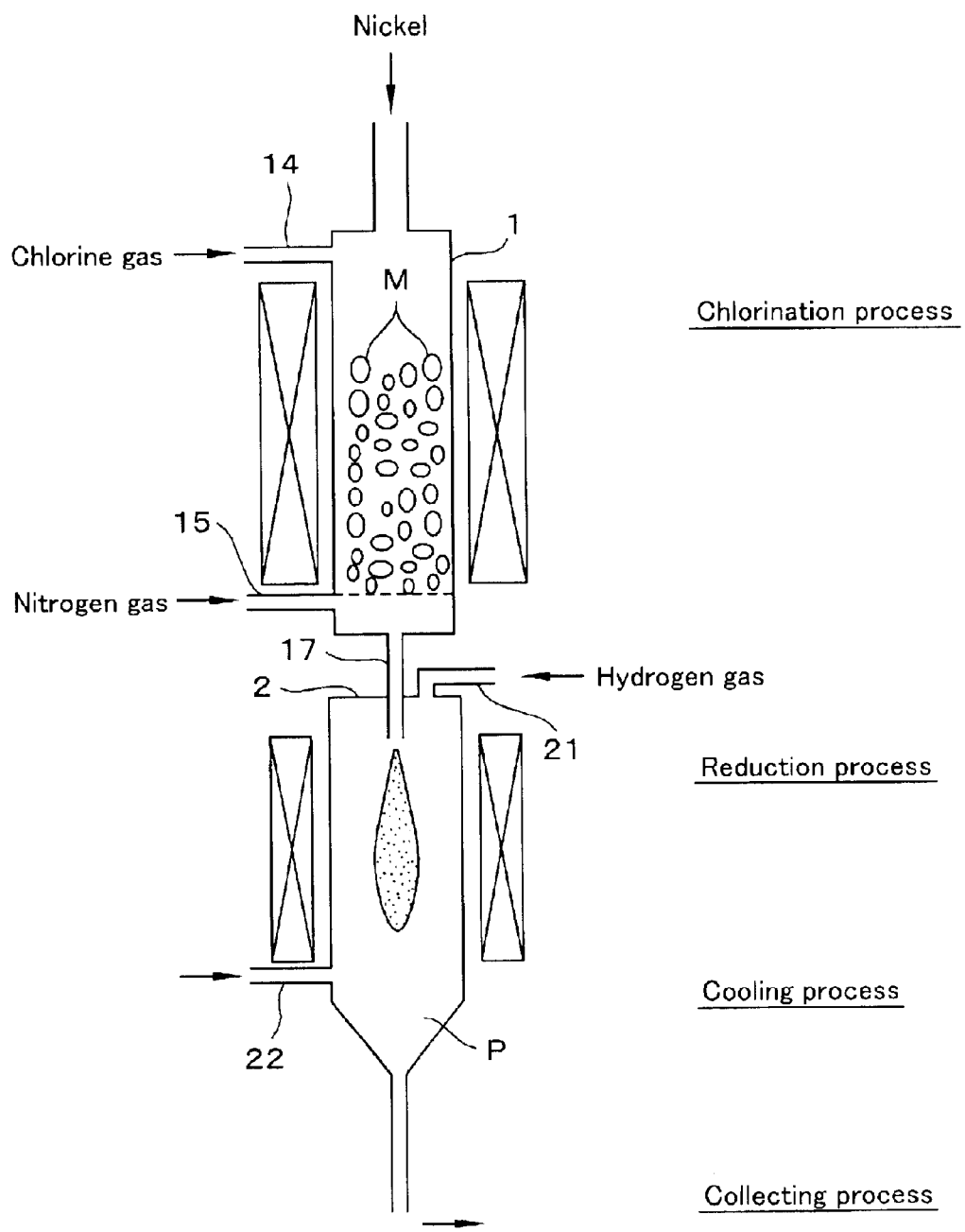
FIG. 1 is a drawing showing a vertical cross section of a production apparatus for the metallic powder of an Example of the present invention.

Next, the present invention is explained in detail by way of examples.

The present invention can be applied to metallic powders which are produced by vapor phase reduction in which metal chloride vapor and reducing gas such as hydrogen, ammonia, or the like are contacted with each other. Ni, Fe, Co, Cu or the like is desirable as a raw material for such metallic powder, and in particular, the present invention is efficient in the production of nickel powder which is used as a raw material for internal electrodes of multilayer ceramic capacitor in which remaining chloride components may have a severe effect to efficiency of a capacitor.

A particle diameter of metallic powders of the present invention is not limited in particular, but it is desirable that the particle diameter be 1.0 $\mu$m or less, advantageously that it be in a range of 0.05 to 0.5 $\mu$m, and more advantageously that it be in a range of 0.1 to 0.4 $\mu$m, in a range of 1 to 40 $m^2$/g to describe in specific surface area by BET. These metallic powders can be produced by techniques already known.

First, a process for production of the metallic powder which is applied by the method of the present invention is simply explained by way of example of nickel powder. Nickel powder and hydrogen chloride are generated by contacting nickel chloride vapor and hydrogen gas in condition of vapor phase in a reducing furnace. Nickel chloride vapor can be generated by heating and vaporizing nickel chloride solid. However, from the viewpoint of prevention of oxidation and moisture absorption and energy efficiency of nickel chloride, it is more advantageous that nickel chloride vapor be generated continuously by contacting nickel metal and chlorine gas, that this nickel chloride vapor be directly supplied to reduction process, and that the nickel chloride vapor be reduced continuously by contacting with hydrogen gas to produce nickel powder.

The particle diameter can be controlled by changing several conditions such as flow velocity, residence time, partial pressure, reducing temperature, and cooling process after reduction of fed nickel chloride gas. Nickel powder which is produced in a reduction process is exhausted from the reduction process with hydrogen chloride, nitrogen gas, and metal chloride vapor which is not yet reacted. The exhausted mixture is fed into water, oil, or bag filter to be separated and collected. After that, the nickel powder is fed to necessary processes such as washing, classifying, and drying. Alternatively, exhausting and washing can be conducted at the same time.

Chloride components such as hydrogen chloride or metal chloride which is not reacted yet remain on the surface of the metallic powder which is immediately after production by the vapor phase reduction mentioned above. The total amount of these chloride components is, depending on the conditions of reduction or diameter of the metallic powder, in a range of about 0.005 to 2% by weight (50 to 20000 weight ppm). The smaller the particle diameter, the larger the amount of chloride components on the nickel powder. A characteristics of the present invention is that the washing process of the metallic powder containing chloride components is conducted in carbonic acid aqueous solution.

In order to remove chloride components, metallic powder was washed with pure water or aqueous ammonia up until now. However, such washing process results to remaining hydroxide, such as nickel hydroxide, on the surface of the metallic powder. If the metallic powder having hydroxide on its surface is dried, non-uniform oxide layer is generated or hydroxide remains, and as a result, dispersibily may deteriorate or properties may be unstable after preparation into a paste. However, by applying the washing process using carbonic acid aqueous solution of the present invention, not only chloride components but also hydroxide on the surface of the metallic powder can be removed as described above.

Methods of the washing process are explained concretely next.
(1) A method in which after carbonic acid is dissolved into water to prepare carbonic acid aqueous solution, the metallic powder is put into the solution and washed.
(2) A method in which after the metallic powder is put into water, and carbonic acid is dissolved into the solution to prepare carbonic acid aqueous solution and the metallic powder is washed.
(3) A method in which after carbonic acid is dissolved into water to prepare carbonic acid aqueous solution, the metallic powder is put into the solution, and the metallic powder is washed while carbonic acid is dissolved further.

The washing process by carbonic acid aqueous solution can be applied in the collecting process of produced metallic powder immediately after the reduction process, after the metallic powder is separated and collected, or after the metallic powder is classified. Tap water, well water, or the like can be used in the washing process of the metallic powder. In the case in which high purity water is required, water in which ions have been removed by ion exchange resin, or filtered water, is usable. Water in which dissolved oxygen is removed is desirable. Ultra-high purity water having no conductivity exhibits superior washing effects.

In the present invention, carbonic acid is prepared by dissolving carbonic acid into the water described above. Since solubility of carbonic acid at 25° C., 1 atm is about 0.15%, a carbonic acid aqueous solution is prepared in a range of 0.05% to saturated concentration, and the pH of the washing solution is desirably in a range of 4 to 6.5, more desirably 5 to 6.5.

An Example of the washing process is explained concretely next.

Metallic powder containing chloride components is added to carbonic acid aqueous solution and agitated sufficiently to remove chloride components. After standing, the metallic powder is separated by removing supernatant by decantation or filtering the solution. If necessary, this process can be repeated. In the washing process by carbonic acid aqueous solution of the present invention, the metallic powder agglomerates together to some extent, and precipitates immediately. Therefore, decantation or filtering can be conducted extremely efficiently, and as a result, chloride components can be removed efficiently.

The washing process by carbonic acid aqueous solution is applied under normal pressure or pressurized condition. In the case in which the washing process is applied under pressurized condition, it is conducted by feeding carbonic acid having a pressure of 0.1 to 5 MPa (gage pressure) into water or water and metallic powder suspension in a pressure vessel. The concentration of carbonic acid is increased under pressurized condition, and chloride components contained in large amount of metallic powder can be removed efficiently even in small amount of water. The temperature of the washing process is desirably in a range of 10 to 60° C., and more desirably 20 to 50° C. from the viewpoint of solubility of carbonic acid and washing efficiency. Ratio of the metallic powder and the washing water is, depending on the amount of chloride components, about 50 to 1000 parts by weight of water per 100 parts by weight of metallic powder.

The chloride components can be efficiently removed by washing the metallic powder with carbonic acid aqueous solution as described above. For example, in the case in which nickel powder containing 0.05% by weight of chloride components is washed, most of the chloride components is removed by washing only once, and after washing is conducted a few times, the chloride components is decreased to 50 ppm or less. After washing process is conducted by the method of present invention, the metallic powder can be separated and collected by precipitating the metallic powder and removing carbonic acid from the carbonic acid aqueous solution containing the metallic powder by heating or reducing pressure.

Furthermore, in the present invention, after the washing process described above, the metallic powder can be classified in a liquid phase if necessary. In the washing process of known techniques mentioned above in which water containing chelating agent or organic acid is used, such a compound is absorbed on the surface of the ultrafine metallic particles, and the compound is difficult to remove even if washed by pure water. Therefore, the ultrafine metallic particles are agglomerated together to form coarse particles, the agglomerated coarse particles are removed in a liquid phase classifying process after the washing process, and as a result, the yield of the metallic powder extremely deteriorated. However, in the washing process of the present invention, although the metallic powder is agglomerated in the washing process, the metallic powder is dispersed again by substituting carbonic acid aqueous solution with pure water, or by heating and removing carbonic acid after the washing process. In this way, from the viewpoint of removing coarse particles and yield of the metallic powder, efficiency of the classification can be improved. As a classifying method which can be performed in a liquid phase, there is a precipitating method, liquid cyclone, or the like.

As described above, the metallic powder is washed by carbonic acid aqueous solution, classified by removing coarse particles if necessary, separated from water by decantation or filtering, and dried to form a product. The method of the present invention is superior in efficiency of chloride components removing, is superior in sedimentation of the metallic powder after being washed, is able to separate and collect the metallic powder more easily, and is able to treat waste liquid more easily, compared to the known washing methods by water containing organic acid or chelating agent. Furthermore, removing processes for the remaining organic compounds on the surface of the metallic powder is not required because the compound does not remain after the washing process of the present invention, and even if the compound does remain, it can be easily removed.

The metallic powder of the present invention produced as described above contains little chloride components, specifically, 100 ppm or less, desirably 50 ppm or less, and more desirably 10 ppm or less. The average particle diameter is in a range of 0.1 to 0.5 $\mu$m, the oxygen content is in a range of 0.1 to 1%, and the metallic powder has a uniform oxide layer having a thickness of about a few nm on its surface.

Next, in a preparing method for a conductive paste of the present invention, an organic dispersing agent is added to the metallic powder such as nickel powder of the present invention and is mixed. That is to say, the conductive paste is prepared by a method in which the metallic powder of the present invention is added to an organic dispersing agent including organic solvent (organic vehicle) such as turpeneol, decyl alcohol and cellulose based organic resin such as ethyl cellulose, and is mixed. Furthermore, plasticizer such as phthalate can also be added. In this way, the metallic powder is highly dispersed and does not agglomerate in the conductive paste prepared with the metallic powder of the present invention. Therefore, multilayer ceramic capacitors prepared using the conductive paste exhibits superior characteristics and shorts and delaminations do not occur.

Next, an example of the production of multilayer ceramic capacitors in which internal electrodes contain the metallic powder, in particular nickel, of the present invention, is explained as follows.

First, barium titanate as a main component and dielectric ceramic composition powder which is containing metal oxide such as magnesium oxide, dysprosium oxide, barium oxide, calcium oxide, silicon oxide, and vanadium oxide are placed into an organic vehicle which is prepared by dissolving binder such as ethyl cellulose into an organic solvent to prepare a dielectric paste. On the other hand, nickel powder having an average diameter of 0.1 to 0.4 μm of the present invention and the organic vehicle mentioned above are mixed to prepare conductive paste for an electrode. Next, the dielectric paste is formed into a sheet by a doctor blade method to prepare a dielectric green sheet. On the other hand, the conductive paste for an internal electrode mentioned above is coated on the dielectric green sheet by screen printing. After they are alternately laminated, this laminated sheet is cut into fixed dimensions to form a green chip. The green chip is heated at 250 to 300° C. in the atmosphere to remove binder. Next, it is baked at 1100 to 1300° C. under a reducing atmosphere such as hydrogen to form a ceramic layered product. After that, the ceramic layered product is annealed at 500 to 1000° C. under an atmosphere of oxygen to oxidize the dielectric layer again. Next, external electrodes which are composed of the same metal as internal electrodes are formed on both end faces of the ceramic layered product so as to connect electrically with the internal electrodes, and plating process is applied on the external electrodes, if necessary, to form multilayer ceramic capacitor.

EXAMPLES

Next, the present invention is explained in detail by way of examples.

Average particle diameter and chlorine content are measured by the following methods.

Measurement of Average Particle Diameter

A picture of the metallic powder (nickel powder) is taken by an electron microscope, diameters of 200 metallic particles in the picture are measured, and the average thereof is calculated. Diameter of the smallest circle which encircles a particle is regarded as the diameter of the particle.

Measurement of Chlorine Content in the Metallic Powder

Chlorine content in the metallic powder is measured by combustion coulometric titration.

A. Production and Washing of Nickel Powder

Example 1

(Production of Nickel Powder by Vapor Phase Reduction)

In a metallic powder production apparatus shown in FIG. 1, nickel powder having average diameters of 0.4 μm was produced in the manner explained below. 15 kg of nickel grain (M) was placed in a chlorination furnace 1, the temperature inside the furnace was set to 1100° C., and chlorine gas was supplied through chlorine gas supplying pipe 14 into the chlorination furnace 1. Nickel metal was chlorinated and $NiCl_2$ vapor was generated. 10 mol % of the supplied amount of chlorine gas was nitrogen gas which was supplied through an inert gas supplying pipe 15 equipped on a lower and side part of the furnace, mixed with $NiCl_2$ vapor, and the mixture gas was fed into reduction furnace 2 through nozzle 17. At the same time, hydrogen gas was supplied into the reduction furnace 2 through reducing gas supplying pipe 21 equipped on top of the reduction furnace 2 to reduce nickel chloride vapor.

After the reduction process mentioned above, nitrogen gas was supplied through cooling gas supplying pipe 22 equipped on lower and side part of the reduction furnace 2 to quench nickel powder (P) and hydrochloric acid which were generated in the reduction, and the nickel powder was separated and collected by filtering. The average diameter of the nickel powder was 0.4 μm.

(Washing of the Nickel Powder)

The first washing: 1 kg of collected nickel powder was put into 1 liter of carbonic acid aqueous solution in which the pH was controlled to 4.1 by dissolving carbonic acid, and the solution was agitated for 10 minutes at 40° C. After 45 minutes of standing, supernatant was removed by decantation.

The second washing: The nickel powder which was separated and collected by decantation was put into 1 liter of pure water, carbonic acid was dissolved into the water and the pH of the solution was controlled to 4.1, and the solution was agitated for 10 minutes at 40° C. After standing, supernatant was removed by decantation.

The third and fourth washing: The second washing process described above was repeated 2 more times.

Applying washing process 4 times as described above, to obtain the nickel powder of Example 1.

Example 2

In Example 1, a gas mixture in which dilution ratio of $NiCl_2$ vapor was increased by adding nitrogen gas beforehand, that is, the partial pressure of $NiCl_2$ was reduced was fed into the reduction furnace 2 through the nozzle 17, reduced by hydrogen, and collected by filtering to produce nickel powder having an average diameter of 0.2 μm. This nickel powder was washed 4 times in the same way as in Example 1, and the nickel powder of Example 2 was obtained.

Comparative Example 1

The nickel powder which was produced in Example 1 (Average diameter: 0.4 μm) was put into pure water, washing process was conducted 4 times in the same way as in Example 1, except that carbonic acid was not dissolved.

Comparative Example 2

The nickel powder which was produced in Example 2 (Average diameter: 0.2 μm) was put into pure water, washing process was conducted 4 times in the same way as in Example 2, except that carbonic acid was not dissolved.

Chlorine content of the nickel powder in Examples 1 and 2 and Comparative Examples 1 and 2 were measured. The results are shown in Table 1.

TABLE 1

| | Chlorine content (ppm) | | | |
|---|---|---|---|---|
| | Average particle diameter 0.4 μm | | Average particle diameter 0.2 μm | |
| | Example 1 | Comparative Example 1 | Example 2 | Comparative Example 2 |
| Before washing | 880 | 880 | 16100 | 16100 |
| The first washing | 60 | 210 | 4700 | 5200 |
| The second washing | 17 | 50 | 1700 | 1800 |
| The third washing | 5 | 24 | 60 | 1500 |
| The fourth washing | 3 | 10 | 20 | 620 |

According to Table 1, the chlorine content was reduced from 880 ppm to 60 ppm by the first washing in Example 1. On the other hand, the chlorine content was reduced to 210 ppm in Comparative Example 1. The pH of the solution after the first washing to the fourth washing in Example 1 were 5.7 to 5.9. In Example 2, the chlorine content of the nickel powder was 1.6% by weight before washing process, it was reduced to 60 ppm after the third washing, and 20 ppm after the fourth washing with carbonic acid aqueous solution. On the other hand, in the case of the washing process with pure water, it was reduced to 1500 ppm after the third washing and 620 ppm after the fourth washing in Comparative Example 2.

Comparative Example 3

1 kg of the nickel powder which was produced in Example 1 (Average particle diameter: 0.4 μm) was put into 10 liters of 0.02% by weight of EDTA aqueous solution at 40° C. and agitated for 10 minutes. The nickel powder was precipitated and supernatant was removed by decantation. The nickel powder was washed by repeating this process 3 times. By this washing process, chloride components of the nickel powder was reduced from 880 ppm to 15 ppm.

Comparative Example 4

1 kg of the nickel powder which was produced in Example 1 (Average particle diameter: 0.4 μm) was put into 10 liters of 0.02% by weight of tartaric acid aqueous solution at 40° C. and agitated for 10 minutes. The nickel powder was precipitated and supernatant was removed by decantation. The nickel powder was washed by repeating this process 3 times. By this washing process, the chloride component of the nickel powder was reduced from 880 ppm to 20 ppm.

B. Ability to Separate and Precipitate Nickel Powder in Water Suspension

Next, the abilities to separate and precipitate nickel powder in water suspension after removing chloride components were observed.

Ability to Precipitate

The suspension of the nickel powder after washing process in Example 1, Comparative Examples 1, 3, and 4 were sampled and nickel powder suspensions A, B, C, and D (concentration of nickel powder in each was 10% by weight) were prepared and precipitation tests were performed. The results are shown in Table 2.

Suspension A: pure water+nickel powder (Comparative Example 1)
Suspension B: carbonic acid aqueous solution (pH 5.1)+ nickel powder Example 1

Suspension C: EDTA (0.02%) aqueous solution+nickel powder

Comparative Example 3

Suspension D: tartaric acid (0.02%) aqueous solution+ nickel powder

Comparative Example 4

Measurement of precipitation time is explained next.

Each suspension described above was put in a measuring cylinder with a ground-in stopper having volume of 1000 ml, the measuring cylinder was inverted 10 times, and after standing, the positions of the interface between supernatant and precipitate were measured per period. Furthermore, after precipitation was completed, the precipitate layer was agitated by a glass rod by hand, and the hardness of the precipitate was observed.

Ability to Separate

In suspension A (Comparative Example 1), B (Example 1), C (Comparative Example 3), and D (Comparative Example 4) described above, suspensions B, C and D were washed by decantation with pure water 5 times. These suspensions are substituted by pure water to prepare suspensions again, dispersed by ultrasonic washer. Particle size distributions of nickel powder in these suspensions were measured by a laser scattering instrument (trade name: LS230, produced by Coulter, Inc.). The results are also shown in Table 2. D90, D50, and D10 mean accumulated particle size at 90%, 50% and 10% respectively, in particular, the greater the values of D90 and D50 become, the more the metallic powder is agglomerated and dispersibility is lowered.

TABLE 2

| | Ability to separate and precipitate | | | | |
|---|---|---|---|---|---|
| | Ability in classification and particle size distribution of nickel powder after washing | | | Precipitation time (minutes) | Condition of precipitation |
| | D90 | D50 | D10 | | |
| Suspension A (Comparative Example 1) | 1.20 | 0.55 | 0.40 | No precipitation after 30 minutes | Smooth after standing overnight |
| Suspension B (Example 1) | 1.35 | 0.65 | 0.30 | 10 | Smooth |
| Suspension C (Comparative Example 3) | 2.40 | 1.20 | 0.70 | 5 | Fixed (difficult to disperse again) |
| Suspension D (Comparative Example 4) | 2.45 | 1.25 | 0.70 | 5 | Fixed (difficult to disperse again) |

As is clear from Table 2, the nickel powder washed by carbonic acid aqueous solution of the present invention is slightly agglomerated together, is precipitated immediately, and the precipitated layer is soft and easy to entangle. Agglomeration of the nickel powder is dispelled by washing and substituting with pure water, and the nickel powder is highly dispersed again. Therefore, wet classification such as decantation or liquid cyclone is easy to perform. Also, carbonic acid which is remaining to the surface of the nickel powder is easily removed by washing with pure water or by heating.

As explained above, in the present invention, metallic powder in which chloride components and coarse particle are only contained slightly can be produced efficiently by washing the metallic powder obtained by a vapor phase reducing method with carbonic acid aqueous solution.

What is claimed is:

1. A process for production of metallic powder comprising:

forming metallic powder by contacting metal chloride vapor and reducing gas, washing the metallic powder in carbonic acid aqueous solution.

2. The process for production of the metallic powder according to claim 1, wherein after metal chloride vapor and reducing gas are contacted to the metallic powder, chloride and hydroxide remaining on the surface of the metallic powder is removed by washing with carbonic acid aqueous solution.

3. The process for production of the metallic powder according to claim 1, wherein the washing process in carbonic acid aqueous solution is conducted in a range of from pH 4.0 to 6.5.

4. The process for production of the metallic powder according to claim 1, wherein after the metallic powder which is obtained by contacting metal chloride vapor and reducing gas is fed in pure water to form a water slurry of the metallic powder, carbonic acid gas is fed in the water slurry to prepare carbonic acid aqueous solution, and the metallic powder is washed in the solution.

5. The process for production of the metallic powder according to claim 1, wherein the metallic powder obtained by the method according to claim 1 is further subjected to wet classification.

6. The process for production of the metallic powder according to claim 1, wherein after the metallic powder is washed by the method according claim 1, dissolved carbonic acid is removed from the washing solution, and the metallic powder is separated and collected.

7. The process for production of the metallic powder according to claim 1, wherein the metal is nickel.

* * * * *